Sept. 1, 1953 B. B. BAUER ET AL 2,650,952

RECORDING AND REPRODUCING HEAD

Filed April 13, 1949 2 Sheets-Sheet 1

Inventors
Benjamin B. Bauer
and Lee Gunter, Jr.
Jesch and Darbo Attys.

Sept. 1, 1953 B. B. BAUER ET AL 2,650,952

RECORDING AND REPRODUCING HEAD

Filed April 13, 1949 2 Sheets-Sheet 2

Inventors.
Benjamin B. Bauer
and Lee Gunter, Jr.
Jesch and Darbo Attys.

Patented Sept. 1, 1953 2,650,952

UNITED STATES PATENT OFFICE 2,650,952

RECORDING AND REPRODUCING HEAD

Benjamin B. Bauer, Oak Park, and Lee Gunter, Jr., Chicago, Ill., assignors to Shure Brothers, Incorporated, Chicago, Ill., a corporation of Illinois Application April 13, 1949, Serial No. 87,276

7 Claims. (Cl. 179—100.2)

This invention relates to magnetic recording and reproducing apparatus which employs an elongated tape having paramagnetic properties as the medium on which the recording is made. It relates to improvements in that part of the apparatus with which the tape is magnetically affected to impart the recording thereto or remove it therefrom, or to do both, which type of apparatus is commonly referred to in the art as the "head." The invention relates particularly to improvements in such apparatus of the general character in which the tape passes in contact with the spaced apart poles of a magnet in such manner that the tape is magnetized in a longitudinal direction.

It is an object of the invention to provide apparatus of the character described in which the flux is effectively concentrated in the portions of the pole pieces which make contact with the tape whereby the flux is utilized with maximum efficiency.

Another object is to provide apparatus of the character described which is of small size whereby space requirements are small.

It is another object to provide an apparatus of the character described in which the core and coil of the magnet are small and the use of only a simple shield is sufficient to suppress hum due to extraneous impulses.

Another object is to provide an apparatus of the character described which has a groove in the surface thereof for the guidance of the tape rather than a totally enclosed opening, whereby the tape can be introduced by lateral insertion rather than by threading through the opening.

Another object is to provide an apparatus of the character described in which several recordings can be placed side-by-side on the tape.

Other objects and advantages will become apparent from the following description and the accompanying drawings, in which.

Figure 1:
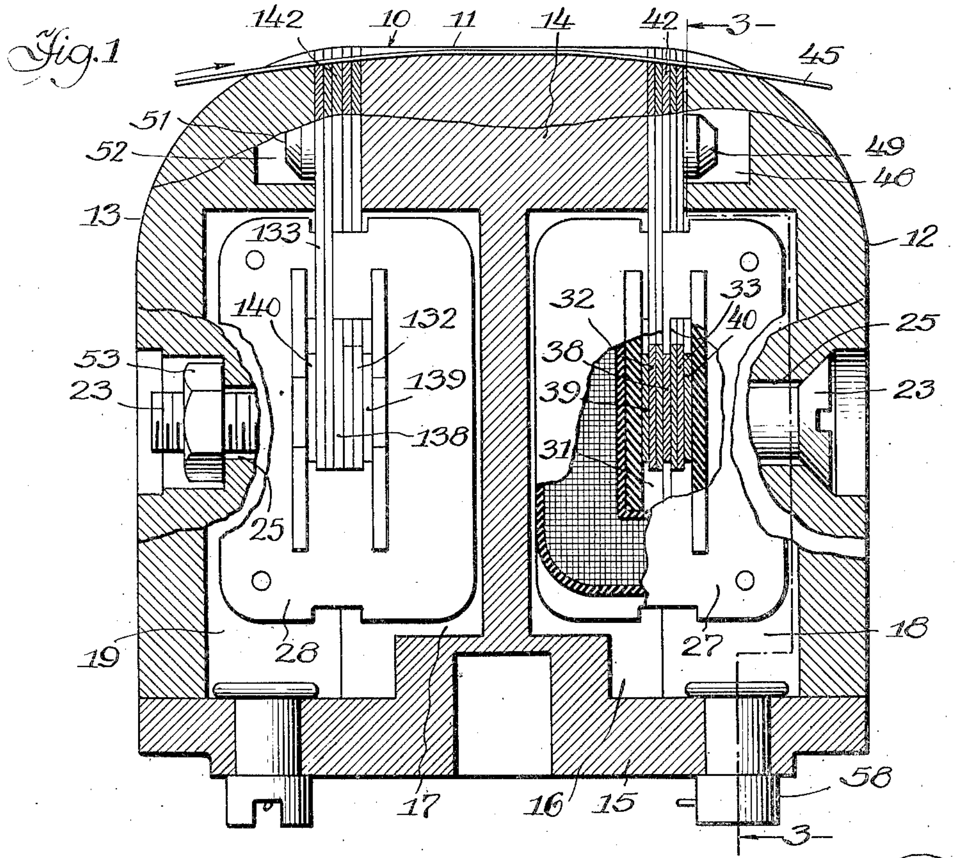
Fig. 1 is a longitudinal sectional view of the improved tape recorder head of the present invention taken along broken line 1—1 of Fig. 3, with portions broken away to show internal structure.

The head consists of a body member 10 which is composed of a suitable non-magnetic material such as phenol formaldehyde resin or the like and which is made up of three sections, the middle section 11 which is in the general shape of an inverted T, and the two end sections 12 and 13. The middle section 11 is composed of an upright portion 14 and a base portion 15, the upright portion 14 having cavities 16 and 17 in the opposite faces thereof. The end sections 12 and 13 are provided with cavities 18 and 19 respectively which are complementary to the cavities 16 and 17. The base portion 15 extends lengthwise beyond the faces of upright portion 14 and serves as the base for the end sections 12 and 13. When said end sections are in place as shown in Fig. 1, the cavities 16—18 and 17—19 are completely enclosed and are adapted to receive parts as will be described hereinafter.

The sections 11, 12 and 13 are held together by the bolts 23 and 24 which pass through openings 25 and 26 in the sections. Within each of the cavities 16—18 and 17—19 is located an electro-magnet, one of the magnets being for the purpose of recording and reproducing and the other for the purpose of erasing a recording from the tape. Each magnet has a winding which is wound upon any suitable support structure, which may be similar to that described in Patent 2,428,826 to Benjamin B. Bauer, and will not be described in detail. The windings with their supports are referred to respectively by the numerals 27 and 28.

The winding 27 has a central opening 31 in which are located the bottom portions of a pair of paramagnetic core members 32 and 33, each of which consists of several laminations as shown. The core members are thin and flat in cross section and have portions of their broad surfaces in overlapping relation as will be described. Member 32 consists of a vertically extending middle section 35 and top and bottom legs 36 and 37 which extend in a generally horizontal direction toward member 33. The latter consists of corresponding parts 35′, 36′ and 37′ and is oriented oppositely to member 32. The bottom legs 37 and 37′ are in overlapping relationship within the opening 31 of the winding 27 and are magnetically connected together by the paramagnetic plate 38 and are firmly held in place in opening 31 by the shims 39 and 40. The top legs 36 and 36′ form the pole pieces of the core and their end portions 41 and 41′ are in overlapping relationship and are separated by the non-magnetic spacing member 42. In Fig.

4, the overlapping portions of the core members are for clearness shown as being slightly out of register with each other, whereas in practice the bottom legs 37 and 37′ are in registry with each other and the top and end edges of sections 41 and 41′ are in registry with each other.

The magnet which has been described has a U-shaped core, the magnetic circuit of which is closed except for the non-magnetic gap provided by spacer 42. To secure maximum efficiency in the utilization of the flux, the pole pieces 36 are so shaped that they extend upwardly as well as toward each other and their width decreases in a direction toward their ends. As a result, their end portions are offset upwardly and are of lesser width with respect to the remainder of the pole pieces, and it is only these narrow offset portions which are in overlapping relationship. The upper edges of said offset portions are straight whereby they are adapted to make contact with the surface of a paramagnetic tape as will be described hereinafter. The construction described provides a high concentration of the flux in the overlapping portions 41 and 41′. The spacer 42 extends between the said overapping portions 41 and 41′ and also between the adjacent portions of the pole pieces 36 and has its upper edge in substantial registry with the upper edges of said portions 41 and 41′. The spacer 42 is preferably composed of a highly conductive, non-magnetic material, such as copper, brass, aluminum or the like. Such material reduces flux leakage between the broad overlapping surfaces of the portions 41 and 41′ and causes most of the flux to pass from one pole piece to the other through the top edges of the last mentioned sections and the tape which travels in contact with said edges as will be described hereinafter. The spacer 42 may be in the shape of a thin rectangular sheet as shown.

The magnet which has been described is contained in the cavity 16—18 and a second magnet is contained in the cavity 17—19, which magnet is similar to the first with the exception that the core laminations are thicker and the non-magnetic spacer between the overlapping portions of the pole pieces is shaped to conform to the shape of the pole pieces. The spacers may be of any desired shape as long as they extend between the overlapping portions of the pole pieces and the portions immediately adjacent thereto. For simplicity of description, the parts of the second magnet are designated by numerals which are 100 greater in value than the numerals for the corresponding parts of the first magnet, and the second magnet will not be described in detail.

Figure 2:
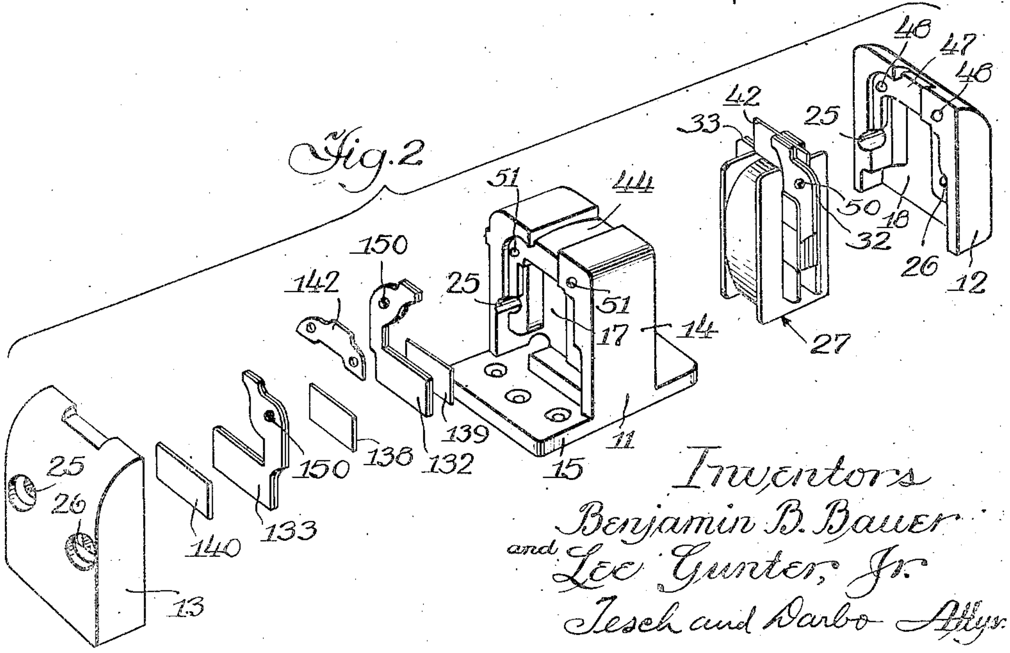
Fig. 2 is an exploded perspective view of said head.

The exploded view shown in Fig. 2 illustrates more clearly the relationship of the parts. Magnet 27 is shown in assembled form, while only the core, spacer and shims of magnet 28 are shown, these parts being in exploded relationship. The shape of cavity 18 in end section 12 is seen, which shape adapts it for the reception of the magnet 27. Said cavity has a shallow extension 47 extending upwardly and laterally to accommodate the upwardly extending portion 41 and the side portion of pole piece 33. Two recesses 48 are provided in section 12, one in the face of the section and the other in the cavity extension 47, said recesses being adapted to cooperate with lugs 49 in the middle section 11 (see Fig. 1) to lock the two sections against relative lateral displacement. The core members 32 and 33 have openings 50 to accommodate the said lugs. The cavity 16 in middle section 11 is complementary to cavity 18 as explained heretofore.

The cavity 17 in middle section 11 is similar to cavity 18 in end section 12 and cavity 19 in end section 13 is complementary to cavity 17 as described heretofore. The relationship of the parts of magnet 28 is clearly shown and since this has been described heretofore, further description is unnecessary. Lugs 51 extend from the face of section 11 and the shallow portion of cavity 17, which lugs are adapted to cooperate with recesses 52 in end section 12 (see Fig. 1). When the parts are arranged together as shown in Fig. 1 and the nut 53 is drawn up tightly upon bolt 23 and a similar nut is tightened upon bolt 24, the said parts are drawn together into a rigid assembly, the lugs 49 and 51 and the recesses 48 and 52 assisting in maintaining the rigid relationship.

The ends 54 and 55 of the winding 27 are connected to the conductive terminal members 57 and 58, which are mounted in the base 17 of the middle section 11, and the ends of winding 28 are connected to similar terminals. Said terminals may be connected to suitable sources of electrical energy, which are not shown.

A broad, flat-bottomed groove 44 is formed in the top surface of the head assembly and extends longitudinally from end to end of the same. A flat-surfaced paramagnetic medium or tape 45 is adapted to travel in the groove in a direction from left to right as indicated by the arrow in Fig. 1. The pole pieces of the two magnets are arranged so that the upper edges of the overlapping portions 141, 141′, 41 and 41′ thereof extend transversely of the groove and coincide with the surface of the groove whereby the traveling tape passes in contact with said edges and across the non-magnetic gaps of the magnets. The tape 45 may be of any suitable paramagnetic construction and is adapted to have a magnetic recording imparted thereto and picked up therefrom and also erased therefrom by the magnets in the well known manner. The magnet 28 may be employed for erasing a previous recording and the magnet 27 for making a new recording or a reproduction from a recording carried by the tape. When a reproduction is being made, magnet 28 is not energized. The stated arrangement is by way of example only and not of limitation, and the relative arrangement of the magnets and direction of travel of the tape may be as desired.

Figure 3:
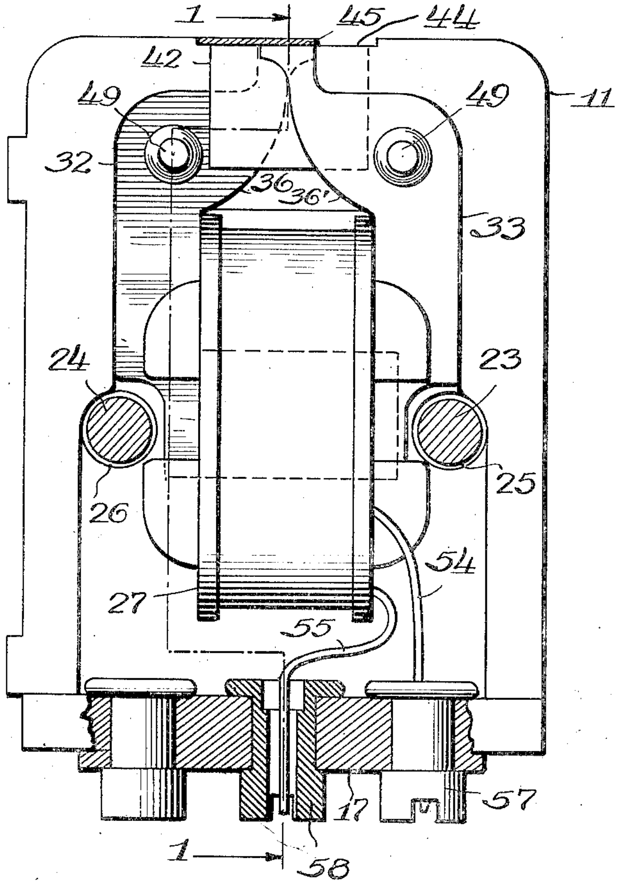
Fig. 3 is a transverse view taken along broken line 3—3 of Fig. 1, with the end section 12 of the head removed.
Figure 4:
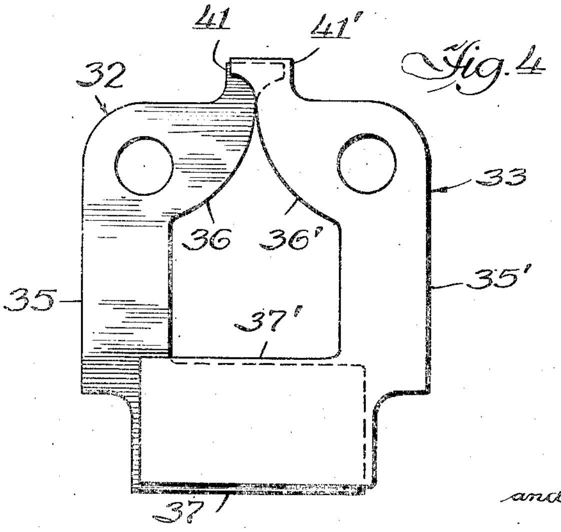
Fig. 4 is a transverse view showing the core members of one of the magnets and their mutual relationship.

The tape 45 may have a width less than the width of the groove 44 but greater than the length of the exposed edges of the overlapping portions 41, 41′, 141 and 141′ of the pole pieces, which edges serve as the poles of the magnets. The tape is guided by a suitable mechanism which is not shown, in accordance with well known practice. This mechanism is usually shiftable laterally, and the tape may be shifted to the edge of the groove in such manner that half of the width of the tape or somewhat less than half of the width travels in contact with the magnetic poles, as is shown in Fig. 3. The recording is therefore imparted to only one half of the tape. The tape may be used again, the feeding and guiding mechanism being shifted so that it travels along the opposite side of the groove or the tape turned over and run on the same side. In either case, the other half of the tape is in contact with the poles, and in this manner, two recordings can be made in side-by-side relationship on the tape.

The construction which has been described has a number of advantages by reason of the core members being of thin flat cross section and arranged with their broad surfaces in overlapping relationship. The head may be made very small. The illustration in Figs. 1 and 2 is greatly enlarged, the actual length from end to end of a unit such as is shown having both erasing and recording magnets being in practice 13/16 inch. This very small size is not more than has usually been used heretofore for either the erasing magnet or the recording and reproducing magnet alone. Space requirements for applicant's head are very small and this is an important item in tape recording apparatus.

The small size provides the further advantage that the unit exhibits but slight response to extraneous disturbing impulses and only a simple shield is required to suppress hum due to such impulses.

By reason of the fact that the width of the pole pieces decreases toward the ends thereof, the flux is concentrated in the overlapping portions 41, 41', 141 and 141' and by reason of the arrangement of the conductive non-magnetic spacers between the overlapping portions with their top edges coinciding with the top edges of the pole pieces substantially all of the concentrated flux is caused to pass through the edges of the tape and there is negligible leakage of flux between other portions of the pole pieces.

Another advantage is that an open groove rather than an enclosed opening is employed, whereby the tape may be introduced by lateral insertion and does not need to be threaded through an opening.

While but a single embodiment of the invention has been described and illustrated, this is by way of example only and the invention is not limited thereto, but variations may be made by those skilled in the art within the scope of the invention as the same is set forth in the appended claims. For example, the groove 44 may be omitted from the top of the head assembly and the upper surface of the head may be made substantially flat and the top edges of the overlapping portions 41, 41', 141 and 141' of the pole pieces may be arranged to be flush with the top surface of the head. The tape feeding mechanism guides the tape satisfactorily in the absence of the groove.

What is claimed is:

1. A transducer comprising an elongated flat-surfaced magnetizable record medium, a magnetizable core having a pair of core parts disposed on opposite sides of the line of travel of said record medium, a pole piece extending inwardly from each said core part and forming a pair of cooperating pole pieces, the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, the laterally projecting side edges of said overlapping end portions being flat and providing a path transversely thereover for one side of said flat-surfaced record medium, said record medium being of a width substantially greater than the lengthwise dimension of said laterally projecting side edges whereby several recordings may be made side by side on said record medium.

2. In transducer means for use with an elongated recording medium and embodying a coil and a magnetizable core, in combination, a pair of core parts adapted to be disposed on opposite sides of the line of travel of the recording medium, a pole piece extending inwardly from each said core part and forming a pair of cooperating pole pieces, the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, the laterally projecting sides edges of said overlapping end portions being flat and providing a path transversely thereover for one side of a flat-surfaced recording medium.

3. In transducer means for use with an elongated recording medium and embodying a coil and a magnetizable core, in combination, a pair of core parts adapted to be disposed on opposite sides of the line of travel of the recording medium, a pole piece extending inwardly from each said core part and forming a pair of cooperating pole pieces, the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, the laterally projecting side edges of said overlapping end portions being flat and providing a path transversely thereover for one side of a flat-surfaced recording medium, and a conductive non-magnetic spacer between said overlapping portions of said pole pieces and having a surface registering with said projecting side edges thereof.

4. In transducer means for use with an elongated recording medium and embodying a coil and a magnetizable core, in combination, a pair of core parts adapted to be disposed on opposite sides of the line of travel of the recording medium, a pole piece of thin flat cross section extending inwardly from each said core part and forming a pair of cooperating pole pieces, the broad surfaces of the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, the laterally projecting side edges of said overlapping end portions being flat and providing a path transversely thereover for one side of a flat-surfaced recording medium.

5. In transducer means for use with an elongated recording medium and embodying a coil and a magnetizable core, in combination, a U-shaped core, a pole piece extending inwardly from each side of the U and forming a pair of cooperating pole pieces, the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, the laterally projecting side edges of said overlapping end portions being flat and providing a path transversely thereover for one side of a flat-surfaced recording medium.

6. In transducer means for use with an elongated recording medium, in combination, a non-magnetic body member having a recess therein, a magnetizable core in said recess and a coil embracing said core, said core having a pair of parts adapted to be disposed on opposite sides of the line of travel of the recording medium, a pole piece extending inwardly from each said core part and forming a pair of cooperating pole pieces, the end portions of said pole pieces being in spaced apart overlapping relationship, said overlapping portions being oppositely directed length-wise of said pole pieces and being offset laterally in the same direction from the main portions thereof, said overlapping portions of said pole pieces being of substantially lesser width than the main portions thereof, said body member having a flat surface registering with the laterally projecting side edges of said overlapping portions of said pole pieces to provide a path transversely over said overlapping portions for one side of a flat-surfaced recording medium.

7. In transducer means for use with an elongated recording medium, in combination, a non-magnetic body member having a recess therein, a magnetizable core in said recess and a coil embracing said core, said core having a pair of parts adapted to be disposed on opposite sides of the line of travel of the recording medium, a pole piece extending inwardly from each said core part and forming a pair of cooperating pole pieces, the end portions of said pole pieces being in spaced apart overlapping relationship, said overlapping portions being oppositely directed lengthwise of said pole pieces and being offset laterally in the same direction from the main portions thereof, said overlapping portions of said pole pieces being of substantially lesser width than the main portions thereof, said body member having a flat bottomed groove therein registering with the laterally projecting side edges of said overlapping portions of said pole pieces to provide a path transversely over said overlapping portions for one side of a flat-surfaced recording medium, the width of the groove in said body member being substantially greater than the corresponding dimension of the surfaces of the pole pieces registering with said groove to enable several recordings to be made side-by-side on a single recording medium.

BENJAMIN B. BAUER.
LEE GUNTER, Jr.

References Cited in the file of this patent

UNITED STATES PATENTS

| Number | Name | Date |
|---|---|---|
| 1,970,424 | Frink | Aug. 14, 1934 |
| 2,245,039 | Lilja | June 10, 1941 |
| 2,418,542 | Camras | Apr. 8, 1947 |
| 2,423,339 | Newman | July 1, 1947 |
| 2,441,679 | Wade | May 18, 1948 |
| 2,469,444 | Roys | May 10, 1949 |
| 2,493,742 | Begun et al. | Jan. 10, 1950 |

FOREIGN PATENTS

| Number | Country | Date |
|---|---|---|
| 239,566 | Switzerland | June 1, 1946 |
| 937,535 | France | Mar. 8, 1948 |